US008265381B2

(12) United States Patent
Ito (10) Patent No.: US 8,265,381 B2
(45) Date of Patent: Sep. 11, 2012

(54) SIGN AUTHENTICATION SYSTEM AND SIGN AUTHENTICATION METHOD

(75) Inventor: Yoichiro Ito, Nagoya (JP)

(73) Assignee: Yoichiro Ito, Nagoya (JP)

( * ) Notice: Subject to any disclaimer, the term of this patent is extended or adjusted under 35 U.S.C. 154(b) by 967 days.

(21) Appl. No.: 11/989,201

(22) PCT Filed: Jul. 25, 2006

(86) PCT No.: PCT/JP2006/314652
§ 371 (c)(1),
(2), (4) Date: Jan. 22, 2008

(87) PCT Pub. No.: WO2007/013444
PCT Pub. Date: Feb. 1, 2007

(65) Prior Publication Data
US 2008/0205766 A1 Aug. 28, 2008

(30) Foreign Application Priority Data
Jul. 25, 2005 (JP) .................... 2005-215072

(51) Int. Cl.
G06K 9/00 (2006.01)
G06K 9/46 (2006.01)
(52) U.S. Cl. .................... 382/165; 382/190
(58) Field of Classification Search ............ None
See application file for complete search history.

(56) References Cited

U.S. PATENT DOCUMENTS

| 5,170,441 | A | * | 12/1992 | Mimura et al. ......... 382/165 |
| 5,418,862 | A | * | 5/1995 | Zheng et al. ........... 382/199 |
| 5,751,854 | A | * | 5/1998 | Saitoh et al. .......... 382/218 |
| 5,949,903 | A | * | 9/1999 | Outa et al. ............ 382/165 |
| 6,115,494 | A | * | 9/2000 | Sonoda et al. .......... 382/165 |
| 6,804,356 | B1 | * | 10/2004 | Krishnamachari ....... 380/201 |
| 6,914,628 | B1 | * | 7/2005 | Kuwata et al. ......... 348/272 |
| 6,952,484 | B1 | * | 10/2005 | Higginbottom et al. ... 382/100 |

(Continued)

FOREIGN PATENT DOCUMENTS

JP    A-2004-102562    4/2004

(Continued)

OTHER PUBLICATIONS

Nako et al, A Trend of Security Techniques for Printing Matter, Sharp Technical Journal, vol. 89, pp. 11-14, 2004 (with translation).

(Continued)

Primary Examiner — Yuzhen Ge
(74) Attorney, Agent, or Firm — Oliff & Berridge, PLC (57) ABSTRACT

To provide a sign authentication system and method for authenticating the originality of an object having a sign such as a seal or a signature or a pattern which can be deemed as a sign, making counterfeit very difficult even if the mechanism of authentication is revealed, obviating the need for being additionally provided with a special device such as an IC chip used for authenticating the originality. A sign authentication system provides reading a sign such as a personal seal impression as color information for each mesh division, extracting feature points from the color information and storing them, and creating a code for authentication from the feature points. The sign is made with an ink containing color material particles smaller than the mesh division. The feature points on the basis of variation of color information caused are extracted when the mesh division is shifted.

9 Claims, 6 Drawing Sheets

U.S. PATENT DOCUMENTS

| | | | |
|---|---|---|---|
| 7,131,776 B2* | 11/2006 | Aoshima et al. | 400/76 |
| 2004/0071311 A1* | 4/2004 | Choi et al. | 382/100 |
| 2004/0078299 A1* | 4/2004 | Down-Logan et al. | 705/27 |
| 2005/0213173 A1* | 9/2005 | Sasaki et al. | 358/514 |
| 2005/0226666 A1* | 10/2005 | Aoshima et al. | 400/76 |
| 2006/0072778 A1* | 4/2006 | Harrington | 382/100 |
| 2006/0104484 A1* | 5/2006 | Bolle et al. | 382/115 |

FOREIGN PATENT DOCUMENTS

| | | |
|---|---|---|
| JP | A-2004-151833 | 5/2004 |
| JP | A-2004-153405 | 5/2004 |
| JP | A-2005-10581 | 1/2005 |
| JP | A-2005-149342 | 6/2005 |
| JP | A-2005-238826 | 9/2005 |
| JP | A-2005-297373 | 10/2005 |

OTHER PUBLICATIONS

Shiohara, Morito, Biometrics Security Using Veins, The Journal of the Institute of Electronics, Information and Communication Engineers, vol. 89, No. 1, pp. 40-45, 2006 (with translation).

RFID Handbook—Principle and Applications of Non-contact IC Card, Daily Industry Newspaper, 2001.

Jul. 27, 2011 European Search Report in Application No. 06781564.7.

Baoshi Zhu et al., "Print signatures for document authentication," Proceedings of the 10$^{th}$ ACM Conference on Computer and Communication Security, CCS, 2003, pp. 145-154.

Van Renesse, R.L., "Paper Based Document Security—A Review," ECOS 97., European Conference on Security and Detection, 1997, UK Apr. 28-30, 1997, London, UK, IEE, UK Apr. 28, 1997, pp. 75-80, xp006507532.

* cited by examiner

SIGN AUTHENTICATION SYSTEM AND SIGN AUTHENTICATION METHOD

TECHNICAL FIELD

The present invention relates to a sign authentication system and sign authentication method for authenticating the object applied with all signs or that can be deemed as a sign, which is a surface material or a solid material on which a somewhat material forming a color is fixed; such that a seal, a signature, a trademark, a logo-mark, a brand mark, an identification mark printed on a bill or the like, a mark applied to a solid material by using a sheet of transfer paper, an identification mark applied on a magnetic card or an IC card or the like is applied to a sheet of paper, wood, cloth, resin, metal or the like or a surface of a solid material, or printed with an ink such as pigment, a dye and the like, drawn, applied with a material such as a paint, or formed with a resin including a color material.

BACKGROUND ART

As the digital printing technique has been developed, counterfeit cases of a bill, securities, a passport and the like have also been increasing, causing a problem in fraud or lowering the level of security. Even with progress in the information processing technology, security countermeasures have not been sufficiently developed yet, such that cases of unauthorized withdrawal by skimming a cash card are still mushrooming. Moreover, the security risk of product whose authentication means still depends on a person, such as counterfeit cases on a high priced goods like a medical product and a brand name product, are left unsolved.

Countermeasures of counterfeits of those authenticated by a machine such as a bill or a cash card authenticated by an automatic vending machine or an automated teller-machine have been developed and some methods have been already used.

For example, as a technique of preventing counterfeit of bill, a hologram, a watermark, a latent image pattern, a pearl ink, a micro character, a special light-emitting ink, an intaglio and the like are known. Authentication with them is performed in the automatic vending machine or the automated teller-machine (Non-Patent Document 1).

As a technique of preventing unauthorized withdrawal using a cash card, a user authentication using a biometrics (living body feature) such as a fingerprint or a vein is performed (Non-Patent Document 2).

Further, an IC chip attached to an ID card or a credit card or an RFID tag applied to a label are also a type of preventing means of counterfeit (Non-Patent Document 3).

[Non-Patent Document 1]
A trend of security techniques for printing matter, Sharp Technical Journal vol. 89, pp. 11-14, 2004

[Non-Patent Document 2]
Biometrics security using veins, The Journal of the Institute of Electronics, Information and Communication Engineers, vol. 89, No. 1, pp. 40-45, 2006

[Non-Patent Document 3]
RFID handbook-principle and applications of non-contact IC card, Daily Industry Newspaper, 2001

Even a technique of preventing counterfeit has been developed in the above-mentioned preventing means of counterfeit, a technique of reproducing has also developed, and thus, more precise counterfeit cases are still mushrooming for the bill, for example. As there many cases a person authenticates an object, counterfeited bills may be circulated even they are not precise. The user authentication means for a cash card is not practical as it takes much time and cost to set in all the machines. The IC chip or the RFID tag can be counterfeited by steeling information, and thus, those applied with them may also be counterfeited.

The present invention is adapted in view of the above-mentioned conventional problems and the problem to be solved is to provide a sign authentication system and a sign authentication method that are hardly ever counterfeited even if the system of the authentication is known, without requiring a special device such as an IC chip for authenticating originality.

DISCLOSURE OF THE INVENTION

The sign authentication system of the present system is a sign authentication system for authenticating a sign such as a seal or a signature, characterized by including reading means for reading the sign as color information for each mesh, and feature point extracting means for extracting feature points from the color information and storing them.

In the sign authentication system of the present invention, a sign is read as color information for each mesh division by the reading means. Here, the sign means all signs such as a seal, a signature, a trademark, a logo-mark, a brand mark, an identification mark printed on a bill or the like, a mark applied to a solid material by using a sheet of transfer paper, an identification mark applied on a magnetic card or an IC card or the like applied to a sheet of paper, wood, cloth, resin, metal or the like or a surface of a solid material, and can be made by any means if only a somewhat material forming a color is fixed on a surface material or a solid material, such as a printing technique including relief printing, depressed surface printing, planographic printing, stencil printing, pad printing and the like, an applying means such as by paint or the like, molding a resin containing a color material. The reading means reads a sign as two-dimensional or three-dimensional digital information with an image scammer, a digital camera or the like. The mesh division refers to a sampling division for a sign being replaced by a digital image. The feature point extracting means extracts a plurality of feature points from the read color information. As the feature points directly induced from the sign is extracted, originality can be authenticated for each sign by using the feature points. As such, a special device such as an IC chip for authenticating originality needs not to be applied. Even if the system of the authentication is known, a sign correctly imitating the feature points needs to be made to counterfeit the sign, and thus, the sign is hardly ever counterfeited.

In the sign authentication system of the present invention, it is further preferable that encrypted code generating means generates a code for authentication from the extracted feature points. As the code for authentication is directly generated from the sign, originality can be easily authenticated for each sign.

In the sign authentication system of the present invention, it is preferable that a sign is added by such means as applying an ink or a paint containing color material particles or forming resin or the like containing color material, and the size of the mesh division is bigger than a color material particle contained in the ink, a paint or resin, and the feature point extracting means obtains a feature point based on variation of color information caused by three-dimensional distributed position of the color material particles when the mesh division is shifted.

As such, if a sign is read by reading means as color information for each mesh division, a plurality of color material particles are in a mesh division, and when the sign is read by shifting the mesh division, the color information changes due to three-dimensional distributed position of the color material particles. Then, if the feature points are extracted by the feature points extracting means based on the change of the color information, information on the mesh division with resolution higher than that defined by the size of the mesh division can be obtained. As the information on the sign is formed on the basis of arrangement of color material particles forming the sign, originality can be authenticated for each sign. As a color material particle is smaller than the size of the mesh division, a sign with the same arrangement of color material particles is hardly ever copied, and thus, the sign is hardly ever counterfeited. For an almost round shaped color material particle, when a light reflected on the color material particle surface is read by a scanner or the like with an image receiving device as color information, stable reflected light can be obtained so that stable color information is likely obtained.

The color material particle contained in an ink, paint, resin or the like are not limited in particular. Other than usual mineral pigments and organic pigments, color agents contained in microcapsules, fine colored plastics and the like can be used as color material particles. The color of the color material particles can be one but two or more colors are preferably used. This is because, as a color are formed based on three-dimensional distributed position of a plurality of color material particles, amount of information including neutral colors significantly increases, which enables originality of the sign to be distinguished in more correct manner.

As a method for the encrypted code generating means to generate a code for authentication from extracted feature points, a method for generating a code for authentication based on a position vector connecting feature points, for example, can be used. This is because even if an amount of color variation differs as the read positions of the mesh division differs at the time it is registered and it is authenticated, matching can be done without being influenced by the values.

It is preferable that the feature points extracting means has position correction means for aligning while a degree of position shift is reflected on a plurality of reading of a sign. Accordingly, the feature point extracting means can precisely obtain feature points causing the color variation based on marginal distribution of the pixel color values at a position from color information of the sign obtained by the reading means.

With the above-mentioned sign authentication system of the present invention, a sign can be authenticated. That is to say, the sign authentication system of the present invention is a sign authentication method for authenticating a sign, characterized by including a reading step of reading the sign as color information for each mesh division and a feature point extracting step of extracting a plurality of feature points from the color information and storing them.

The extracting is preferably to extract a feature of a sign independent of resolution at the reading. That enables authentication without being influenced by different reading means such as a different model of a scanner, and increases flexibility of a reading appliance at registration and authentication.

In the sign authentication method of the present invention, it is preferable to have code generating for generating a code for authentication from the extracted feature points. That enables originality to be easily authenticated for each sign as a code for authentication is directly generated from a sign.

It is preferable that a code for authentication contains a code indicating sign attachment used for attaching a sign to be authenticated (for example, a seal, a person who placed a signature, each appliance for printing, applying or forming a trademark or various marks) In this manner, a seal, a person who did a signature, a device that performed printing, color applying, molding or the like can also be authorized.

If a sign is applied to a sheet of paper with an ink or a paint to be used in the sign authentication method of the present invention, color material particles forming the sign is fixed to a place as it is attached to a sheet of paper or the like. The ink may contain a binder for firmly fixing the color material particles on a sheet of paper or the like. Any binder whether colored or colorless will do, if only it does not prevent capturing of the color material particles. As a binder, that can prevent color-fading and discolor of the color material particles.

DESCRIPTION OF SYMBOLS 1 sign authentication system
2 reading means (scanner)
S3, S21 reading process
S6, S7, S23, S24 feature point extracting process
S8, S25 code creating process

BEST MODE FOR CARRYING OUT THE INVENTION

Embodiments implementing a sign authentication system and a sign authentication method of the present invention will be described below.
<Sign Authentication System>

Figure 1:
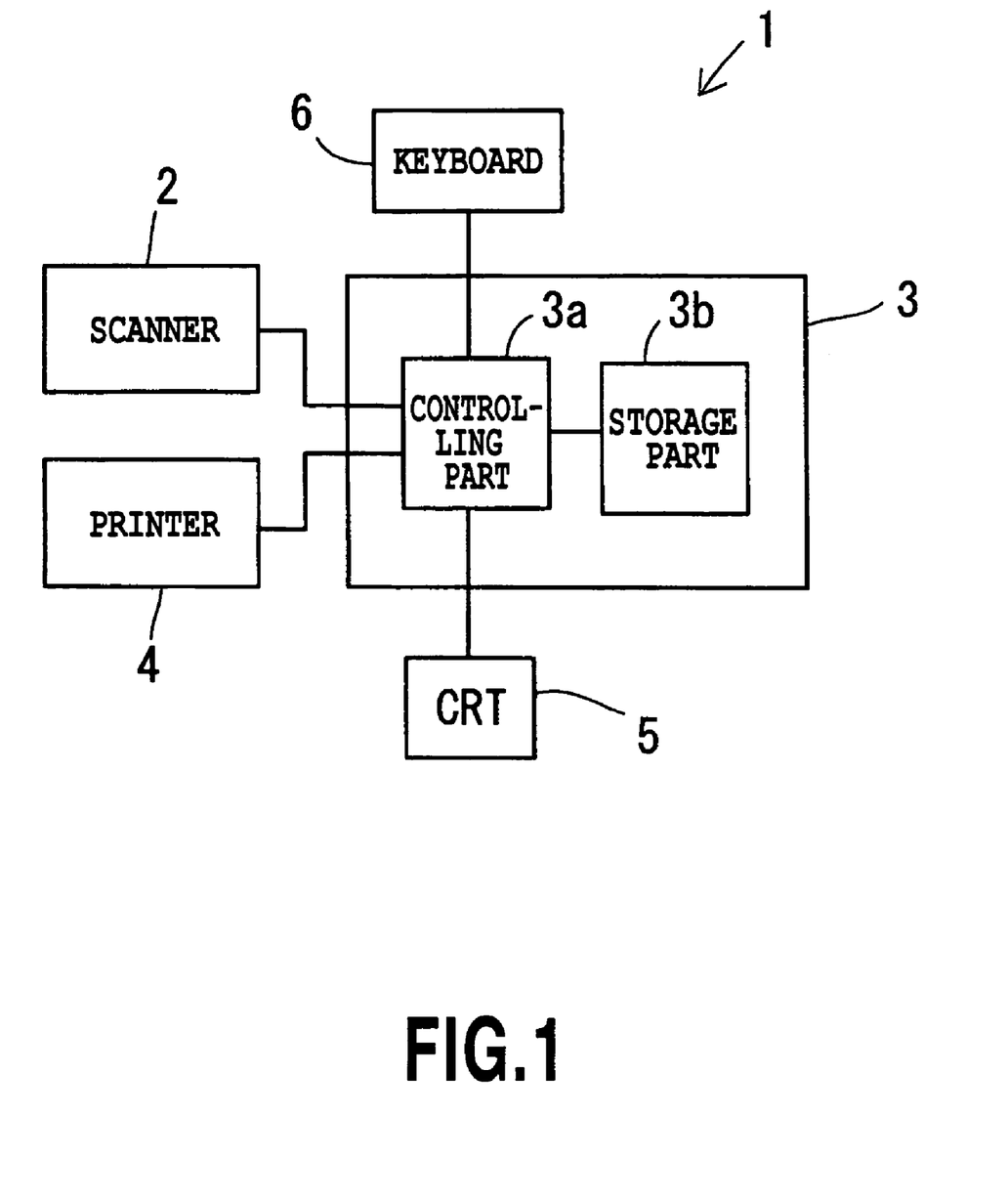
FIG. 1 is a block diagram of a sign authentication system.

An authentication test was conducted on an imitation bill that is printed as below. An ink containing color material particles in almost round shape was used for a printing ink. FIG. 1 is a block diagram showing a configuration of a sign authentication system 1 as an example of the present invention. The sign authentication system 1 includes a scanner 2, a computer 3, a printer 4, a CRT 5 and a keyboard 6.

The scanner 2 reads a sign as color information for each mesh division. The computer 3 includes a controlling part 3a formed by a CPU and a storage part 3b formed by a hard disk. The storage part 3b stores a sign cutting out program for cutting out a sign by the scanner 2 and obtaining color information, a feature point extracting program for extracting a plurality of feature points from color information of the sign and storing them and a code generating program for generating a code for authentication from the extracted feature points. The CPU forming the controlling part 3a reads a feature point extracting program and a code generating program and controls over the system. In the embodiment, the sign authentication system takes an embodiment using a computer, though, it can be implemented in a cellular terminal or a cellular phone, a register with a special-purpose reading appliance, or an automatic vending machine, for example, if only it has reader formed by a CCD camera and a controlling part formed by a CPU, a storage part formed by a memory or a hard disk, display formed by a CRT or a liquid crystal display and input part formed by a keyboard or a switch.

Now, operations of the sign authentication system will be described with an example of the system applied to a bill.

<Bill Registration>

Figure 2:
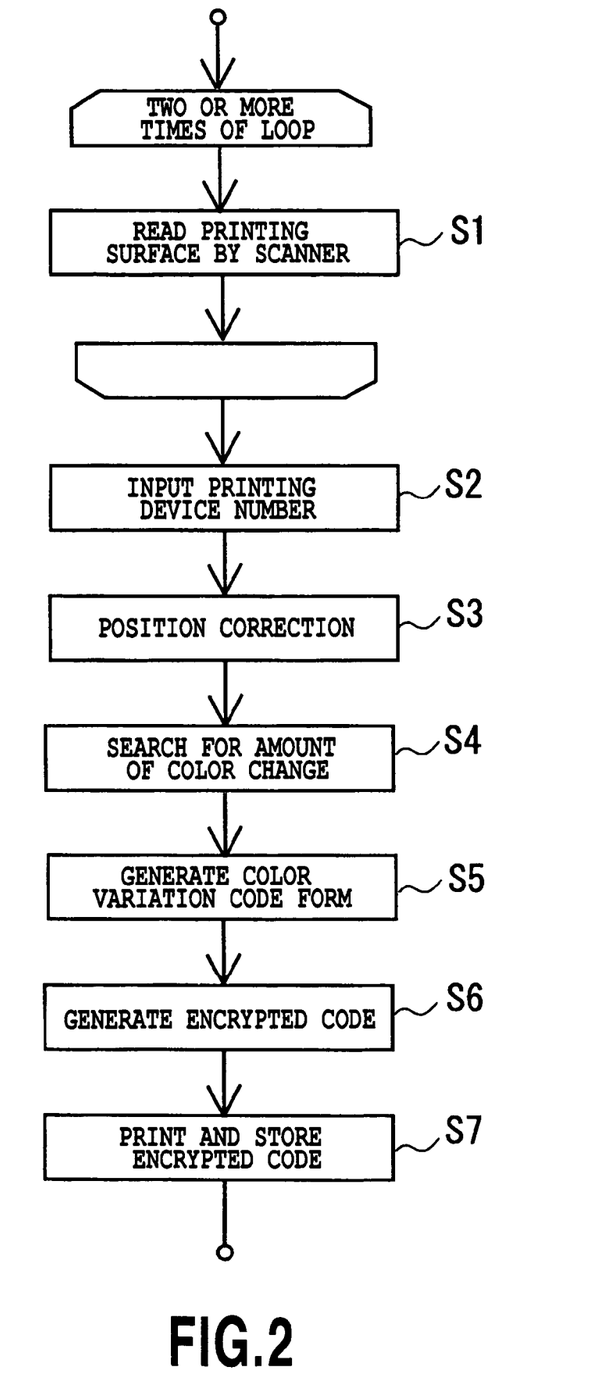
FIG. 2 is a flowchart of bill registration.
Figure 3:
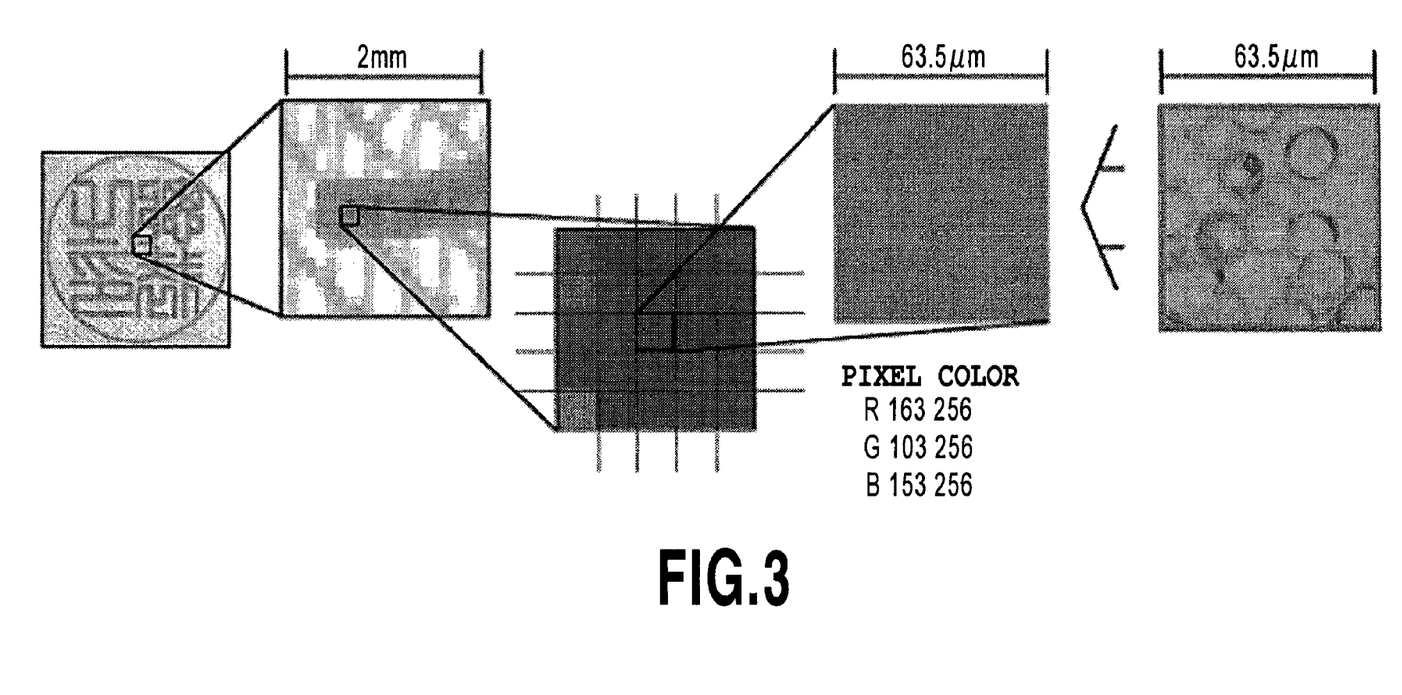
FIG. 3 is a pattern diagram showing a printing surface being converted into pixel colors.
Figure 4:
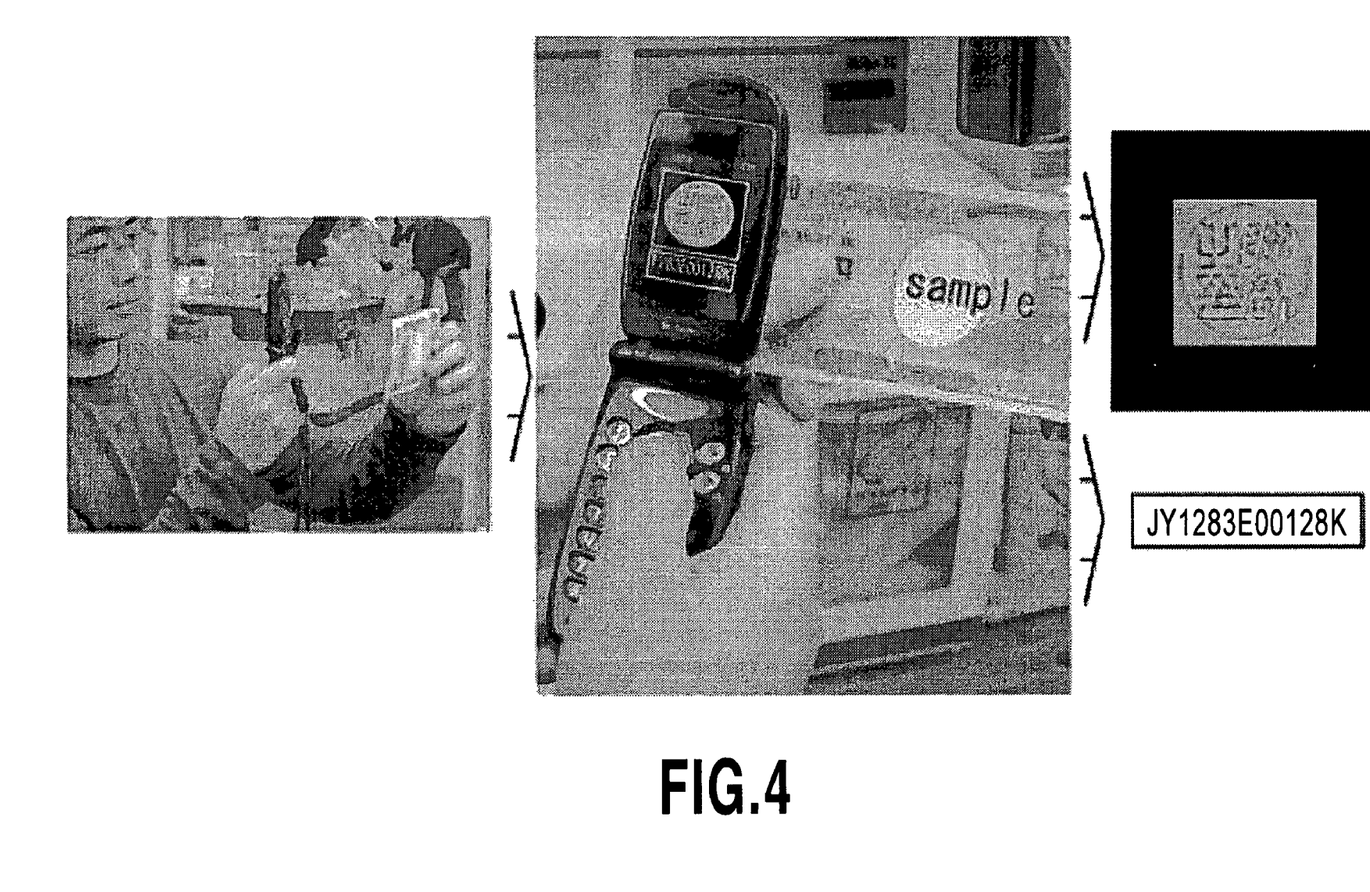
FIG. 4 is image diagram of processes of steps 1 to 3.

The bill registration is performed as below according to the flowchart shown in FIG. 2. First, a bill to be registered is set in the scanner 2 and reading of the printing surface for color information for each mesh division is conducted for two or more times (step S1). The step S3 is a reading process. Here, the scanner 2 obtains color information by optical resolution according to the size of the mesh division by optical reaction elements divided into meshes in XY array and stores the information in the storage part 3b. On the other hand, as color material particles of the ink are smaller than the mesh division (for example, if the scanner 2 obtains color information with resolution of 600 dpi, the mesh division is 42.3 μm for each side, which is bigger than a color material particle), a color composition of some color material particles in the mesh division is converted into pixel color as an RGB value for a single color. The mesh converted into a pixel color in this manner is defined as a color changed cluster. Scanning is conducted for a plurality of times, and thus, a pixel color value changes for each scanning as mesh division on a printing surface differs for each scanning. FIG. 3 shows a pattern diagram showing a printing surface being converted into pixel colors. A registered number unique to the used printing device is input from a keyboard 6 and saved in the storage part 3b (step S2). Images of the processes at the steps 1 to 3 are shown are shown in FIG. 4.

Next, based on color information read for multiple times at the step S1, a feature point extracting program is called from the storage part 3b and the location is compensated (step S3) like below. That is to say, in step S3, color information in vertical, horizontal and revolving for each scanning at reading the printing surface for multiple times is recorded as two-dimensional or three-dimensional space coordinates for each color. Then, they are arranged for any two combinations from a plurality of read images, and a difference of each two-dimensional coordinate is calculated by obtaining an amount of color phase transition based on the phase correlation and calculating parallel movement and revolving position, with which images are most close, with the unit of sub-pixel.

After matching relative positions of a plurality of read images with such position correction, by executing the program, an amount of change of a pixel color value at each position is obtained based on marginal distribution of the pixel color values against a sub pixel position according to arrangement obtained at the step S5 of the read image taken by a plurality of scannings at the step 1, and a degree of influence to the vicinity of each mesh is calculated by multi-variate analysis on vector variation developed on a color surface (step S4).

Figure 5:
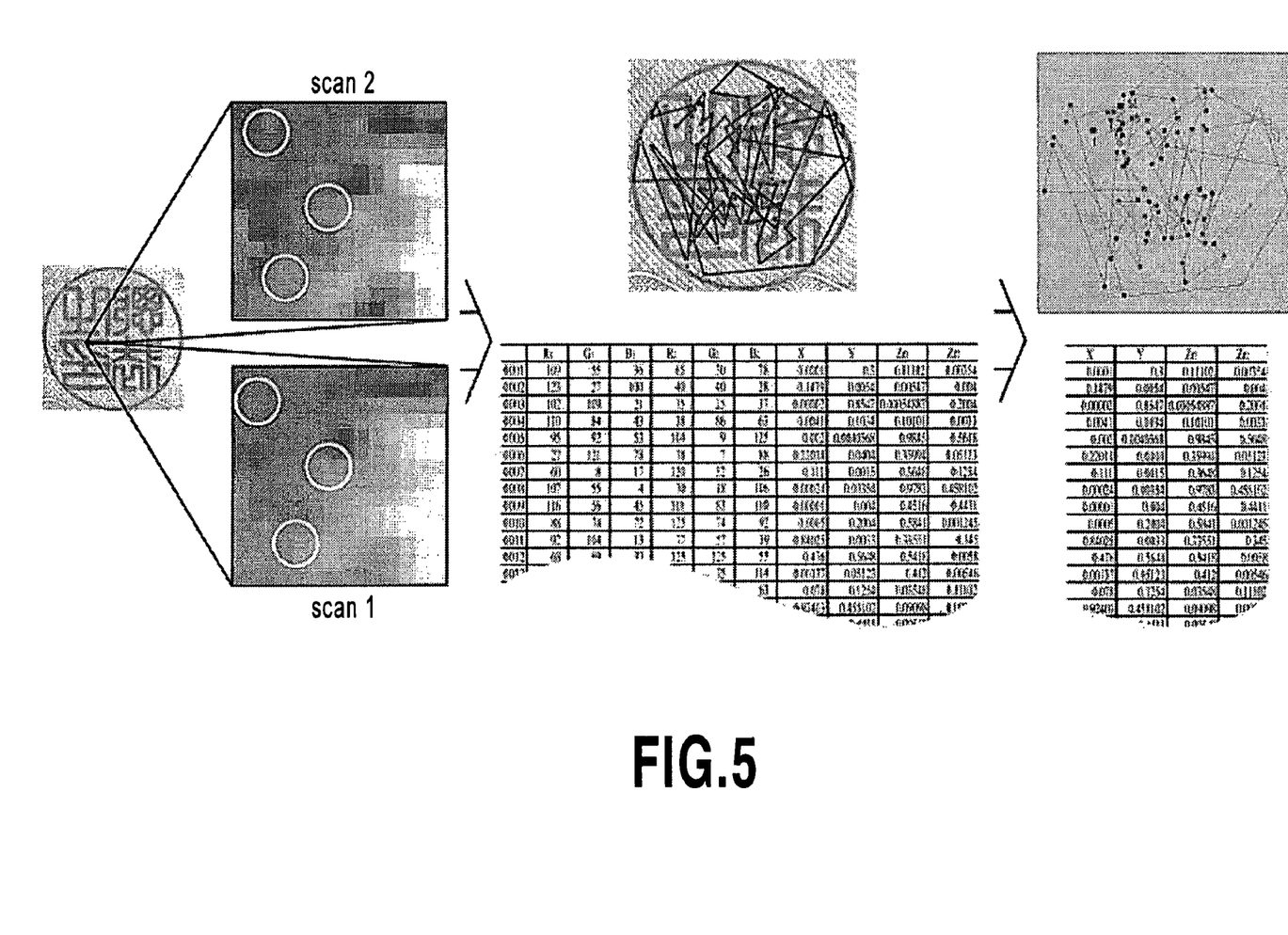
FIG. 5 is a diagram showing how to extract a color variation code form.

At the step S5, a code generating program is called from the storage part 3b. Executing the program, feature points are obtained at the step S4 in descending order in color variation and extracts information of two-dimensional or three-dimensional position vector (position and distance) (hereinafter referred to as "color variation code form") of an association line that associates feature point positions according to the order (see FIG. 5). Then, using the color variation code form, an encrypted code with a registration number unique to a printing device input is generated at the step S2 (step S6), printing it as a paper document, and stores data of the registration number unique to the printing device in the storage part 3b as a color variation code form in the storage part 3b (step S7). As a method for generating the encrypted code, a method such as 3DES (Triple Date Encryption Standard), RSA (Rivest Shamir Adleman) or the like may be used. Thus, the bill registration has finished.

<Bill Authentication>

Figure 6:
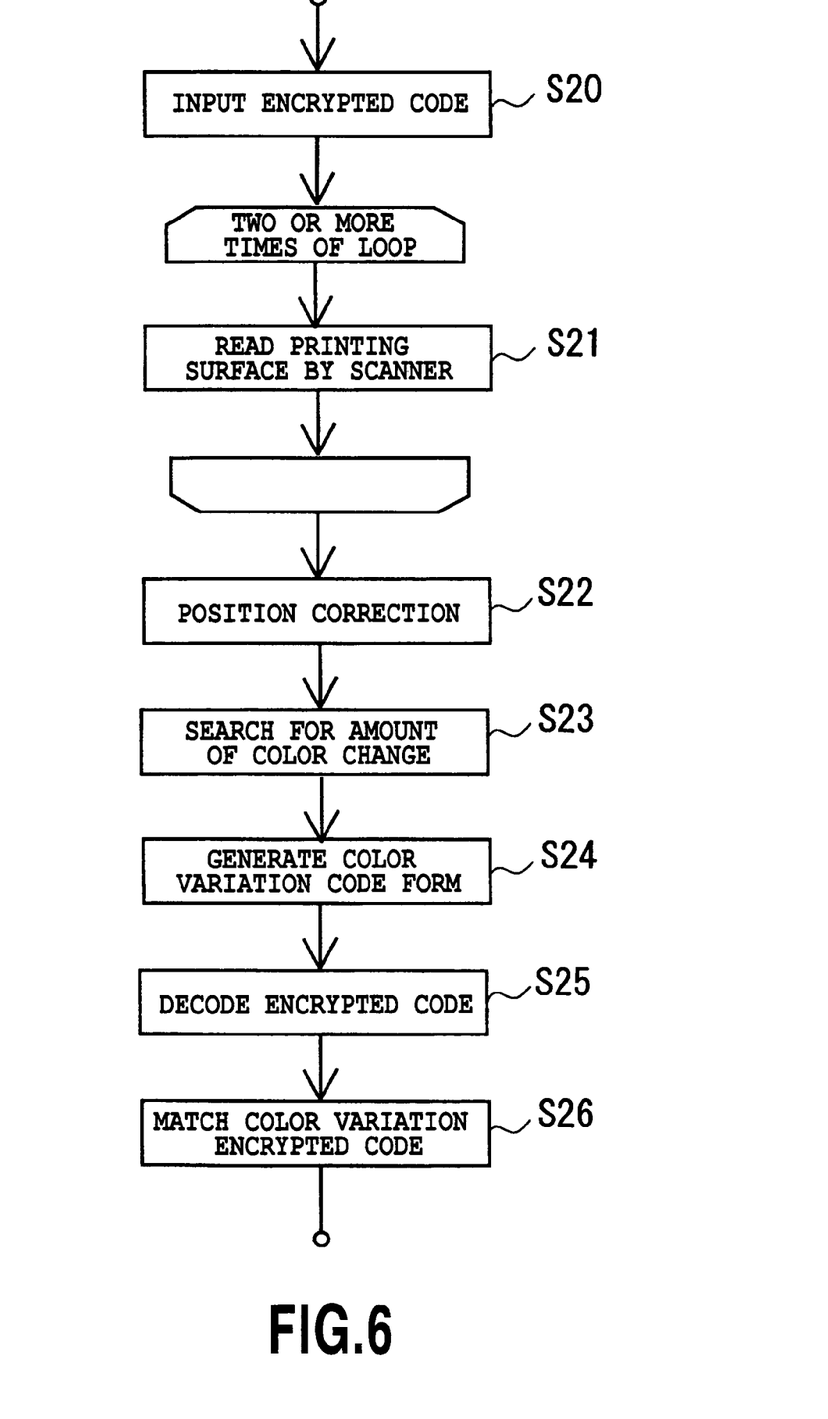
FIG. 6 is a flowchart of bill authentication.

Authentication of the bill done as above will be conducted according the flowchart shown in FIG. 6.

First, at least one of the encrypted code applied on the bill to be authenticated and the registration number unique to a printing device is input from the keyboard 6 (step S20). Then, the bill is set in the scanner 2 and color information for each mesh division of the printing surface of the bill is read for two or more times in the same manner as that taken at the step S1 (step S21). Then, the position is corrected (step S22), an amount of variation of a pixel color value for each mesh is obtained (step S23), the color variation code form is generated (step S24) and an encrypted code is generated (step S25). The steps S22 to S25 are the same as the above-mentioned steps S3 to S6, and thus, they will be omitted from the description.

Then, data on the color variation code form, the encrypted code and the registration number unique to the printing device obtained at the registration of the bill is called from the storage part 3b, and matches the color variation code form obtained by the above-mentioned bill authentication and the color variation code form obtained by decoding the input encrypted code by vector matching. It is also matched with the registration number unique to the printing device obtained by decoding the encryption code of the bill. Then, the result is displayed on the CRT 5 and the matching result is printed by the printer 4 (step S26). Thus, the bill authentication has finished.

As such, with the sign authentication system of the embodiment, only by setting an object of the authentication such as a paper document or the like applied with a sign in the scanner 2 and reading it, a code for the authentication is directly generated so that originality can be authenticated for each object of the authentication. Even if how the method of authentication is found, the document is hardly ever counterfeit. The system can be installed without any special device such as an IC chip for authenticating originality.

As the authentication system is performed based on a quite fine structure of color material particles contained in paint or the like forming the signs applied to an object of the authentication such as a paper document instead of based on the form of the signs, the object of the authentication is hardly ever copied nor counterfeited.

Although the color variation code form obtained by the authentication of an object of the authentication such as a paper document and a color variation code form obtained by decoding an input encrypted code are matched by vector matching in the above-mentioned sign authentication system, however, the system can be adapted to directly match the color variation code form obtained by the authentication of the object of the authentication with the color variation code form obtained at the registration of the object of the authentication. In the latter manner, the above-mentioned step S25 of generating an encrypted code can be omitted.

Although the authentication is performed on the bill in the embodiment, that method can be used to authenticate all the object applied with a sign or that can be deemed as a sign, which is a surface material or a solid material on which a somewhat material forming a color is fixed; such that a seal, a signature, a trademark, a logo-mark, a brand mark, an identification mark printed on a bill or the like, a mark applied to a solid material by using a sheet of transfer paper, an identification mark applied on a magnetic card or an IC card or the like is applied to a sheet of paper, wood, cloth, resin, metal or the like or a surface of a solid material, or printed with an ink such as pigment, a dye and the like, drawn, applied with a material such as a paint, or formed with resin including a color material.

INDUSTRIAL APPLICABILITY

The present invention may provide a sign authentication system or a sign authentication method for authenticating originality of an important document such as a bill that is an object of counterfeit, securities, a contract document, a ticket, a passport or the like, a label, a packet, a package, a credit card, a printed matter such as a published matter or the like, a brand name product, an industrial product or the like.

The invention claimed is:

1. A sign authentication system, comprising:
a reader that is configured to divide, using a mesh, an authentication target into mesh divisions, wherein the authentication target is made using a plurality of color material particles smaller than the mesh divisions, and read color information for each mesh division two or more times, shifting the mesh and each mesh division for each reading; and
a feature point extractor that is configured to: (1) extract feature points from the color information based on variations of the color information caused by reading the color information and shifting the mesh division for each reading by the reader, and (2) store the extracted feature points, wherein
the shifting of the mesh is a translation of the mesh in an amount less than a length of a side of a mesh division such that each translated mesh division corresponds to a different portion of the authentication target than before the shifting.

2. The sign authentication system according to claim 1, wherein
the authentication target is formed by an ink containing color material particles,
a size of the mesh division is larger than the color material particles contained in the ink, and
the feature point extractor extracts the feature points based on variations of the color information caused by three-dimensional distributed positions of the color material particles when the mesh division is shifted.

3. The sign authentication system according to claim 1, further comprising an encrypted code generator that is configured to generate a code for authentication from the extracted feature points.

4. The sign authentication system according to claim 3, wherein the encrypted code generator generates the code for authentication based on a position vector connecting the extracted feature points.

5. The sign authentication system according to claim 1, wherein the feature point extractor comprises a position corrector that is configured to align while a degree of position shift is reflected on a plurality of readings of the authentication target.

6. A sign authentication method, comprising:
dividing, using a mesh, an authentication target into mesh divisions, wherein the authentication target is made using a plurality of color material particles smaller than the mesh divisions;
reading color information for each mesh division two or more times;
shifting the mesh and each mesh division for each reading;
extracting feature points from the color information based on variations of the color information caused by reading the color information and shifting the mesh division for each reading; and
storing the extracted feature points, wherein
the shifting of the mesh is a translation of the mesh in an amount less than a length of a side of a mesh division such that each translated mesh division corresponds to a different portion of the authentication target than before the shifting.

7. The sign authentication method according to claim 6, wherein extracting the feature points extracts a feature of the authentication target independent of a resolution used at the dividing and the reading.

8. The sign authentication method according to claim 7, further comprising generating a code for authentication from the extracted feature points.

9. The sign authentication method according to claim 8, wherein the generated code for authentication comprises sign attachment used for attaching a sign to be authenticated.

* * * * *